(12) United States Patent
Lee et al.

(10) Patent No.: US 10,491,362 B2
(45) Date of Patent: Nov. 26, 2019

(54) METHOD FOR TRANSMITTING/RECEIVING SIGNALS BY USING TDD SCHEME IN WIRELESS COMMUNICATION SYSTEM, AND COMMUNICATION DEVICE FOR SAME

(71) Applicant: LG ELECTRONICS INC., Seoul (KR)

(72) Inventors: Sangrim Lee, Seoul (KR); Hojae Lee, Seoul (KR); Kwangseok Noh, Seoul (KR); Dongkyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/770,685

(22) PCT Filed: Jul. 12, 2016

(86) PCT No.: PCT/KR2016/007554
§ 371 (c)(1),
(2) Date: Apr. 24, 2018

(87) PCT Pub. No.: WO2017/086566
PCT Pub. Date: May 26, 2017

(65) Prior Publication Data
US 2019/0058572 A1 Feb. 21, 2019

Related U.S. Application Data

(60) Provisional application No. 62/257,200, filed on Nov. 18, 2015, provisional application No. 62/257,745, filed on Nov. 20, 2015.

(51) Int. Cl.
*H04W 4/00* (2018.01)
*H04L 5/14* (2006.01)
(Continued)

(52) U.S. Cl.
CPC .............. *H04L 5/1469* (2013.01); *H04L 1/00* (2013.01); *H04L 1/18* (2013.01); *H04L 5/0044* (2013.01); *H04L 5/0048* (2013.01); *H04L 27/26* (2013.01); *H04L 27/2607* (2013.01); *H04L 5/0007* (2013.01); *H04L 5/0055* (2013.01)

(58) Field of Classification Search
None
See application file for complete search history.

(56) References Cited

U.S. PATENT DOCUMENTS

2013/0010780 A1* 1/2013 Fertonani ............. H04B 1/7073
370/342
2013/0044651 A1* 2/2013 Wang ................ H04W 72/0406
370/280

(Continued)

*Primary Examiner* — Clemence S Han
(74) *Attorney, Agent, or Firm* — Birch, Stewart, Kolasch & Birch, LLP

(57) ABSTRACT

This method for a communication device to transmit/receive signals by using a TDD scheme in a wireless communication system may comprise the steps of: receiving information related to a guard period (GP) position in a data zone of a particular subframe; receiving downlink data in the data zone of the particular subframe on the basis of the information related to the GP position; and transmitting uplink data in the data zone of the particular subframe on the basis of the information related to the GP position.

18 Claims, 12 Drawing Sheets

(51) Int. Cl.
*H04L 1/00* (2006.01)
*H04L 1/18* (2006.01)
*H04L 27/26* (2006.01)
*H04L 5/00* (2006.01)

(56) References Cited

U.S. PATENT DOCUMENTS

| | | | |
|---|---|---|---|
| 2013/0083710 A1* | 4/2013 | Chen | H04W 72/042 |
| | | | 370/281 |
| 2014/0086119 A1 | 3/2014 | Yang et al. | |
| 2014/0254415 A1* | 9/2014 | Chen | H04L 27/0006 |
| | | | 370/252 |
| 2014/0293968 A1* | 10/2014 | Ebrahimi Tazeh Mahalleh | |
| | | | H04W 56/001 |
| | | | 370/336 |
| 2015/0103702 A1* | 4/2015 | Lahetkangas | H04L 5/0044 |
| | | | 370/280 |
| 2015/0117270 A1* | 4/2015 | Um | H04L 5/1461 |
| | | | 370/278 |

\* cited by examiner

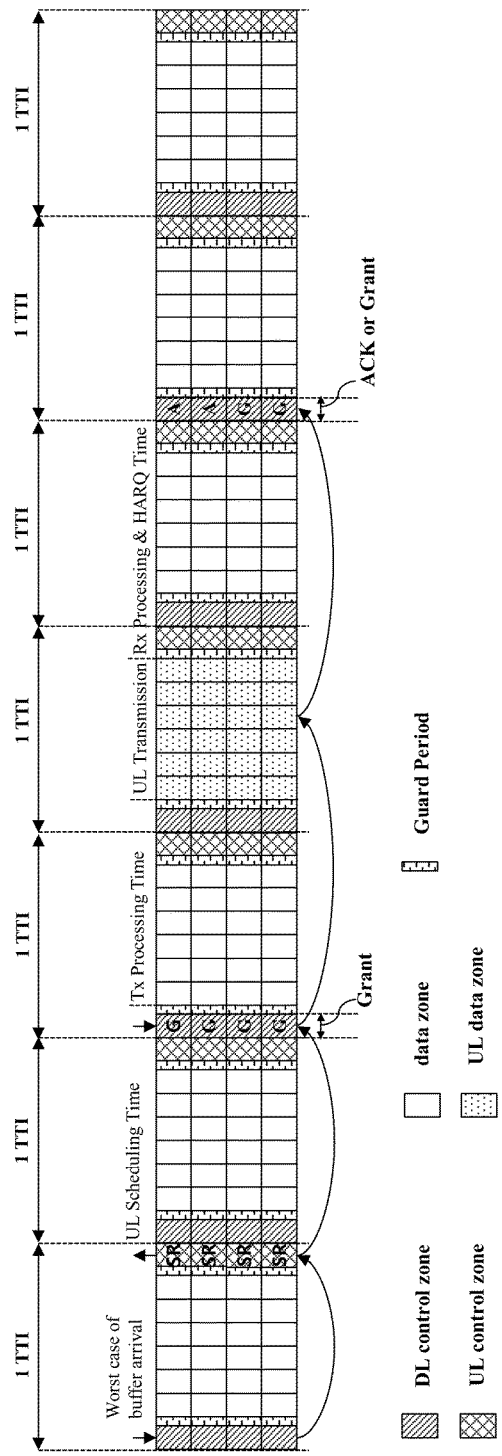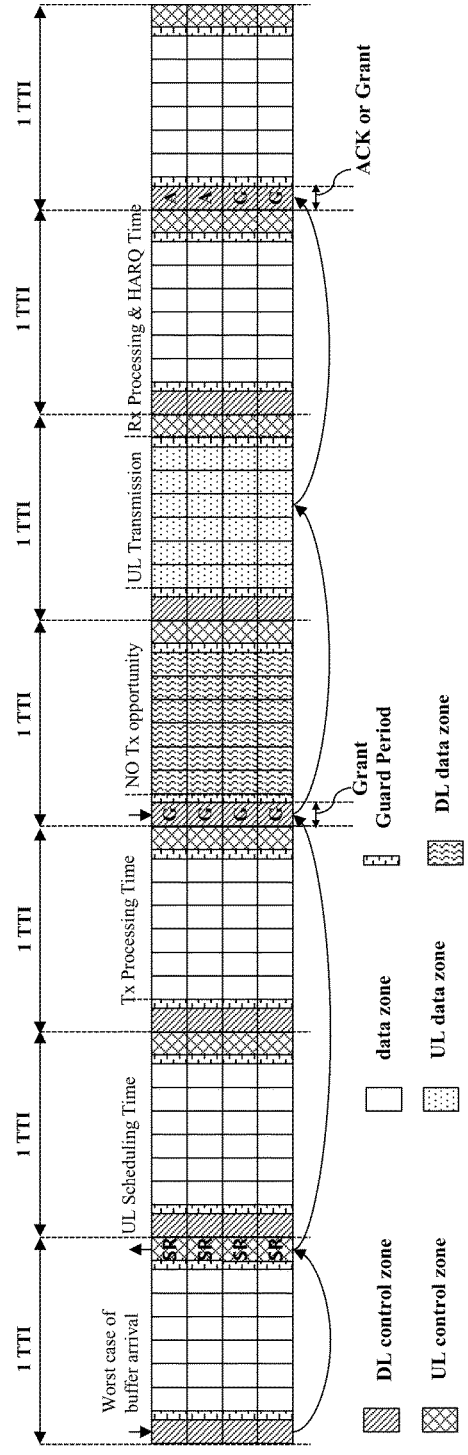

METHOD FOR TRANSMITTING/RECEIVING
SIGNALS BY USING TDD SCHEME IN
WIRELESS COMMUNICATION SYSTEM,
AND COMMUNICATION DEVICE FOR
SAME

CROSS REFERENCE TO RELATED
APPLICATIONS

This application is the National Phase of PCT International Application No. PCT/KR2016/007554, filed on Jul. 12, 2016, which claims priority under 35 U.S.C. 119(e) to U.S. Provisional Application Nos. 62/257,200, filed on Nov. 18, 2015 and 6/257,745, filed on Nov. 20, 2015, all of which are hereby expressly incorporated by reference into the present application.

TECHNICAL FIELD

The present invention relates to a wireless communication system, and more particularly, to a method of transmitting and receiving a signal using a TDD scheme in a wireless communication system and an apparatus therefor.

BACKGROUND ART

3GPP LTE (3rd Generation Partnership Project Long Term Evolution) system is designed with a frame structure having a TTI (transmission time interval) of 1 ms and data requirement latency time for a video application is 10 ms. Yet, with the advent of a new application such as real-time control and tactile internet, 5G technology in the future requires data transmission of lower latency and it is anticipated that 5G data requirement latency time is going to be lowered to 1 ms.

However, the legacy frame structure of 1 ms TTI is unable to satisfy the 1 ms data requirement latency. 5G aims to provide data latency reduced as much as 10 times compared to the legacy data latency.

Although 5G communication system requires a new frame structure to solve the abovementioned problem, the new frame structure has not been proposed yet.

DISCLOSURE OF THE INVENTION

Technical Tasks

A technical task of the present invention is to provide a method for a communication apparatus to transmit and receive a signal using a TDD scheme in a wireless communication system.

Another technical task of the present invention is to provide a communication apparatus for transmitting and receiving a signal using a TDD scheme in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method for transmitting and receiving signals, by a communication apparatus, using a TDD scheme in a wireless communication system, includes receiving information related to a position of a guard period (GP) in a data zone of a specific subframe, receiving downlink data in the data zone of the specific subframe based on the information related to the position of the GP, and transmitting uplink data in the data zone of the specific subframe based on the information related to the position of the GP. The information related to the position of the GP in the data zone can be received in the specific subframe. The information related to the position of the GP in the data zone can be received in a subframe appearing prior to the specific subframe as many as M number of subframes. The information related to the position of the GP in the data zone can be received via a PCFICH (physical control format indicator channel) of the specific subframe. The information related to the position of the GP in the data zone can be received via a downlink control channel of the specific subframe. The downlink data can be received during a symbol period ranging from a start symbol of the data zone of the specific subframe to a symbol immediately before a symbol at which the GP is positioned based on the information related to the position of the GP. The uplink data can be transmitted during a symbol period ranging from a symbol immediately after a symbol at which the GP is positioned to a symbol prior to an uplink control zone in the specific subframe based on the information related to the position of the GP.

To further achieve these and other advantages and in accordance with the purpose of the present invention, according to a different embodiment, a communication apparatus for transmitting and receiving signals using a TDD scheme in a wireless communication system includes a receiver, a transmitter, and a processor, the processor configured to control the receiver to receive information related to a position of a GP (guard period) in a data zone of a specific subframe and receive downlink data in the data zone of the specific subframe based on the information related to the position of the GP, the processor configured to control the transmitter to transmit uplink data in the data zone of the specific subframe based on the information related to the position of the GP. The processor can control the receiver to receive the information related to the position of the GP in the data zone of the specific subframe. The processor can control the receiver to receive the information related to the position of the GP in the data zone in a subframe appearing prior to the specific subframe as many as M number of subframes. The processor can control the receiver to receive the information related to the position of the GP in the data zone via a PCFICH (physical control format indicator channel) of the specific subframe. The processor can control the receiver to receive the information related to the position of the GP in the data zone via a downlink control channel of the specific subframe. The processor can control the receiver to receive the downlink data during a symbol period ranging from a start symbol of the data zone of the specific subframe to a symbol immediately before a symbol at which the GP is positioned based on the information related to the position of the GP. The processor can control the transmitter to transmit the uplink data during a symbol period ranging from a symbol immediately after a symbol at which the GP is positioned to a symbol prior to an uplink control zone in the specific subframe based on the information related to the position of the GP.

Advantageous Effects

According to a frame structure provided by the present invention, it is able to achieve low latency (i.e., OTA (w/ initiation)<1 ms) corresponding to 5G service requirement and provide DL/UL flexibility capable of efficiently supporting asymmetry of DL/UL traffic as much as possible.

According to one embodiment, it is able to efficiently perform communication by securing DL/UL flexibility as much as possible according to a proposed TDD frame structure.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 6 is a diagram for a HARQ procedure when a UL resource of a data zone is immediately allocated;

FIG. 7 is a diagram for a HARQ procedure when a UL resource of a data zone is not immediately allocated;

BEST MODE

Mode for Invention

Figure 1:
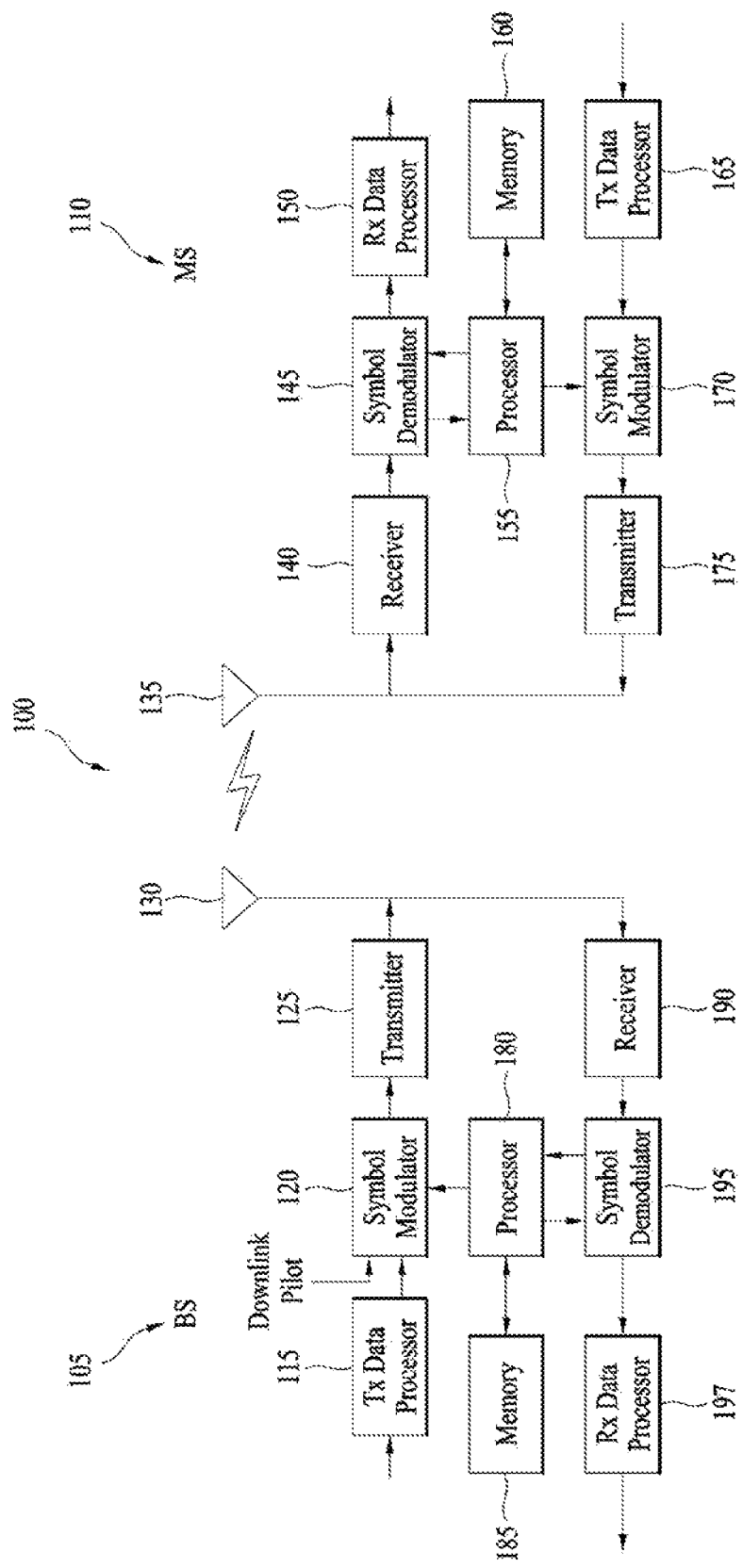
FIG. 1 is a block diagram for configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage apparatus as a user equipment (UE), a mobile station (MS), an advanced mobile station (AMS) and the like. And, assume that a base station (BS) is a common name of such a random node of a network stage communicating with a terminal as a Node B (NB), an eNode B (base station), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

In case of performing wireless transmission between a base station and a UE, a transmission to the UE from the base station is commonly referred to as a DL transmission and a transmission to the base station from the UE is commonly referred to as a UL transmission. A scheme of determining a radio resource between the DL transmission and the UL transmission is defined as duplex. When a frequency band is divided into a DL transmission band and a UL transmission band and transmission and reception are performed in both directions, it is referred to as frequency division duplex (FDD).

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention proposes new and various frame structures for a 5$^{th}$ generation (5G) communication system. In a next generation 5G system, scenarios can be classified into Enhanced Mobile BroadBand (eMBB), Ultra-reliable Machine-Type Communications (uMTC), Massive Machine-Type Communications (mMTC), and the like. The eMBB corresponds to a next generation mobile communication scenario having such a characteristic as high spectrum efficiency, high user experienced data rate, high peak data rate, and the like, the uMTC corresponds to a next generation mobile communication scenario having such a characteristic as ultra-reliable, ultra-low latency, ultra-high availability, and the like (e.g., V2X, Emergency Service, Remote Control), and the mMTC corresponds to a next generation mobile communication scenario having such a characteristic as low cost, low energy, short packet, and massive connectivity (e.g., IoT).

Figure 2:
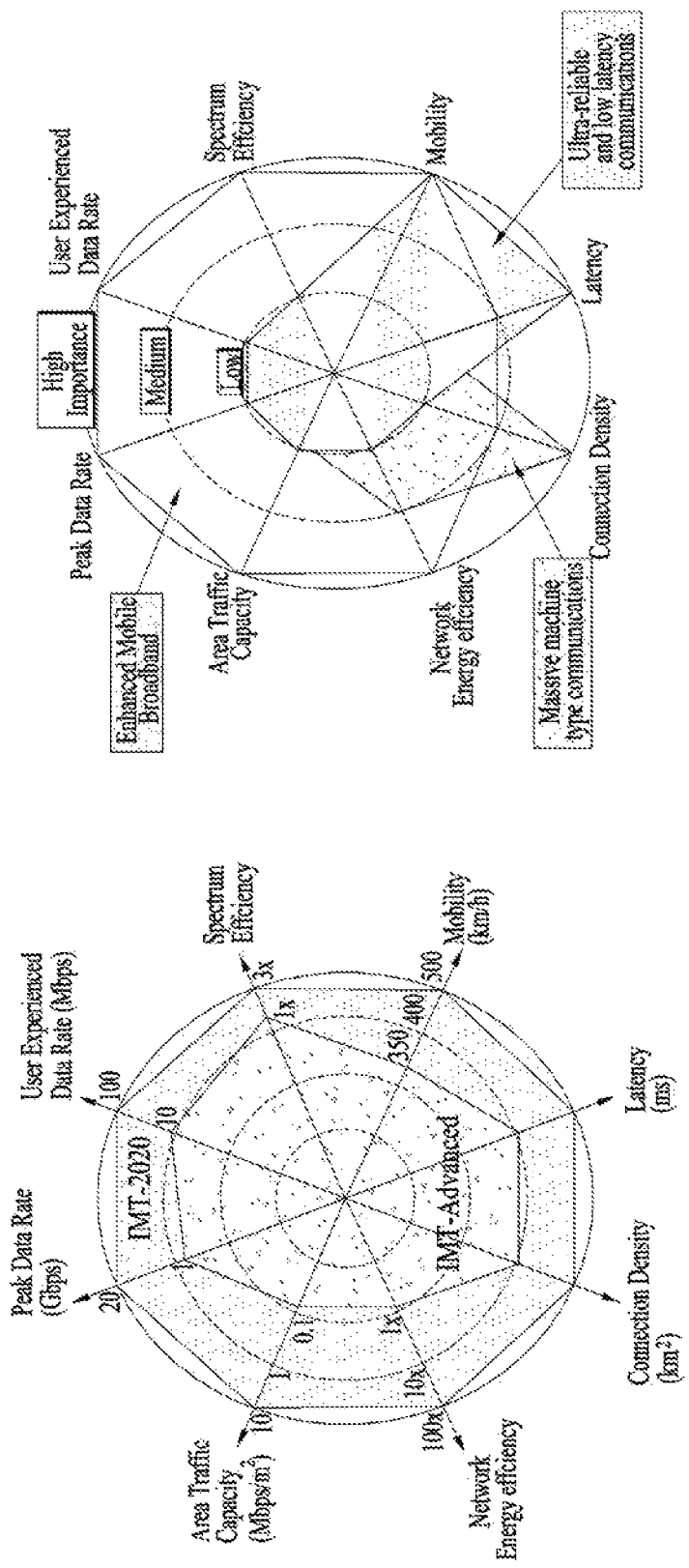
FIG. 2 is a diagram for explaining correlation between IMT 2020 core performance requirement for 5G and 5G performance requirement per service scenario.

FIG. 2 is a diagram for explaining correlation between IMT 2020 core performance requirement for 5G and 5G performance requirement per service scenario.

FIG. 2 illustrates correlation between core performance requirement for 5G proposed by IMT 2020 and 5G performance requirement per service scenario.

In particular, uMTC service has very high restriction on Over The Air (OTA) Latency Requirement and requires high mobility and high reliability (OTA Latency: <1 ms, Mobility: >500 km/h, BLER: <10$^{-6}$).

Figure 3:
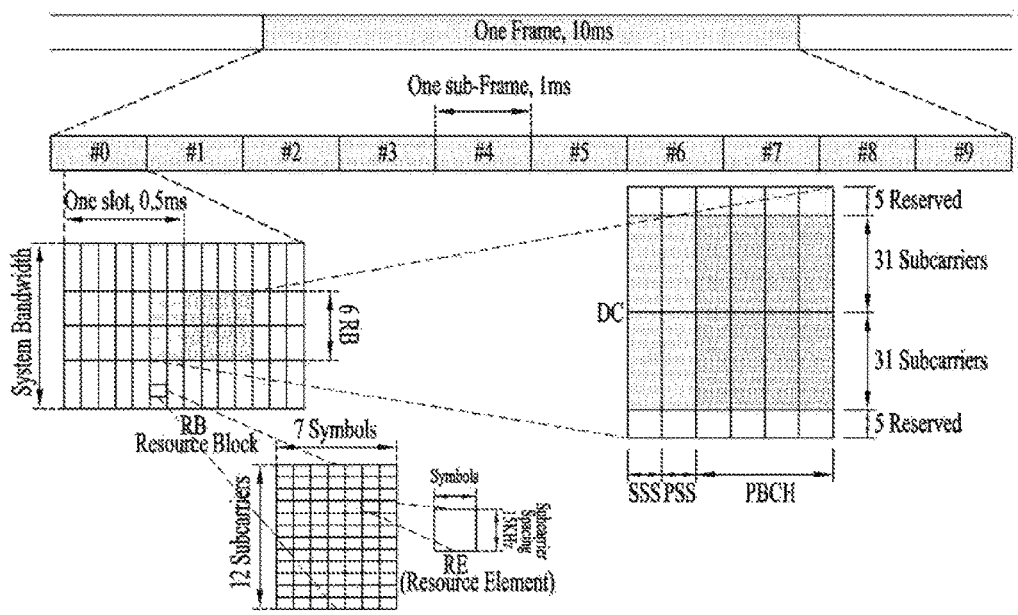
FIG. 3 is a diagram for LTE/LTE-A frame structure.

FIG. 3 is a diagram for LTE/LTE-A frame structure.

FIG. 3 shows a basic concept of a frame structure of LTE/LTE-A. One frame corresponds to 10 ms and includes 10 1-ms subframes. One subframe includes 2 0.5-ms slots and one slot includes 7 OFDM (Orthogonal Frequency Division Multiplexing) symbols. One resource block (RB) is defined by 12 subcarriers each of which has 15 kHz space and 7 OFDM symbols. A base station delivers a primary synchronization signal (PSS) and a secondary synchronization signal (SSS) for synchronization a physical broadcast channel (PBCH) for system information in a center frequency (6RBs). In this case, it may have a difference in the frame structure and positions of the signal and the channel depending on a normal/extended CP (cyclic prefix) and TDD (Time Division Duplex)/FDD (Frequency Division Duplex).

Figure 4:
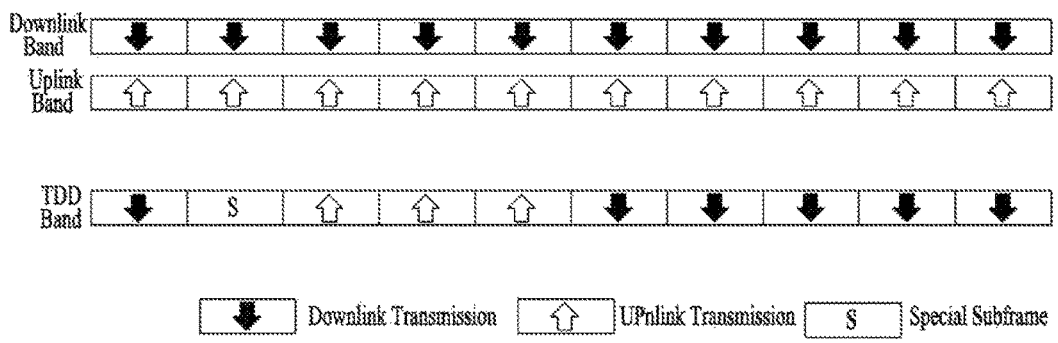
FIG. 4 is a diagram for an example of FDD/TDD frame structure in LTE/LTE-A system.

FIG. 4 is a diagram for an example of FDD/TDD frame structure in LTE/LTE-A system.

Referring to FIG. 4, in case of a FDD frame structure, a downlink frequency band is distinguished from an uplink frequency band. In case of a TDD frame structure, a downlink region is distinguished from an uplink region in a subframe unit in the same band.

Figure 5A:
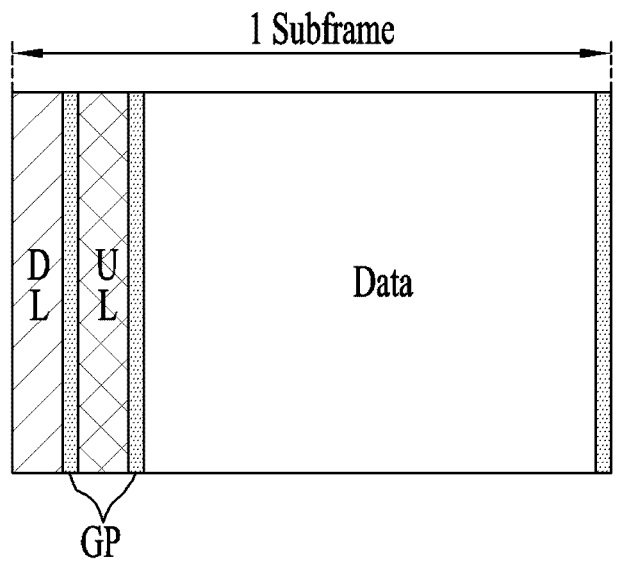
FIGS. 5A and 5B are diagrams for an example of a self-contained subframe structure.
Figure 5B:
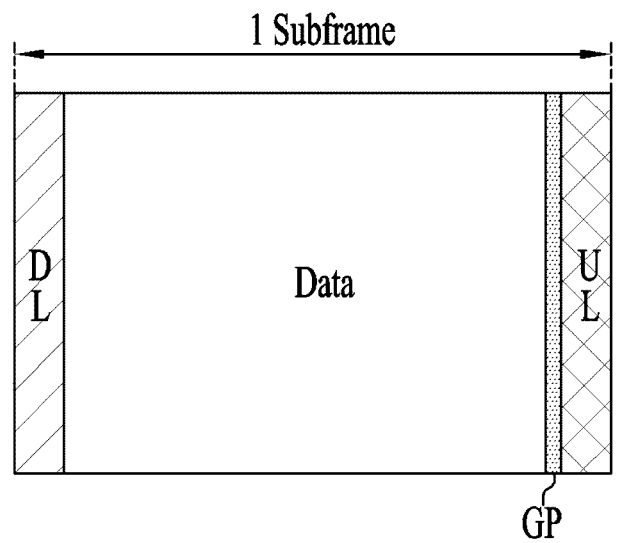

FIGS. 5A and 5B are diagram for an example of a self-contained subframe structure.

FIGS. 5A and 5B illustrate a self-contained subframe structure which is proposed to satisfy a low-latency requirement among 5G performance requirements. A TDD-based self-contained subframe structure has a resource section for downlink, a resource section for uplink (e.g., a downlink control channel and an uplink control channel), a guard period (GP) for solving an interference issue between downlink and uplink, and a resource section for data transmission in a single subframe.

FIG. 5A shows an example of a self-contained subframe structure. A subframe is configured in an order of a resource section for downlink, a resource section for uplink, and a resource section for data and a GP exists between the resource sections. In FIG. 5A, a downlink resource section represented as DL may correspond to a resource section for a downlink control channel and an uplink resource section represented as UL may correspond to a resource section for an uplink control channel.

FIG. 5B shows a different example of a self-contained subframe structure. A subframe is configured in an order of a resource section for downlink, a resource section for data, and a resource section for uplink and a GP exists prior to the resource section for uplink only. In FIG. 5B, a downlink resource section represented as DL may correspond to a resource section for a downlink control channel and an uplink resource section represented as UL may correspond to a resource section for an uplink control channel.

The next generation 5G system is considering V2X targeting ultra-low latency, eMBB service targeting emergency service, machine control, and data speed, and the like. Hence, it is necessary to design a frame structure capable of supporting low latency (OTA <1 ms) and high degree of freedom of DL/UL data. And, it is necessary to design a commonality-based single frame structure which is not necessary to be redesigned in TDD or FDD operation scheme.

In order to provide the low latency and the degree of freedom of DL/UL data configuration in the next generation 5G system, the present invention proposes a method of configuring a new frame structure and a control zone. In the present specification, such a term as a zone indicates a resource. Such a terms as a region, a channel, and the like can be used together with the zone in the same meaning.

Proposal 1: New Frame Structure (Adaptive/Self-Contained Frame Structure) for 5G Systems It is difficult to satisfy a requirement of OTA <1 ms in a current LTE/LTE-A TDD frame structure. And, although TDD scheme provides various TDD DL/UL configurations to efficiently support asymmetry (DL traffic>UL traffic) of DL/UL data amount, it causes a complex procedure for HARQ (hybrid automatic repeat request) ACK/NACK time depending on a TDD DL/UL configuration. In order to solve the problem, as shown in FIGS. 5A and 5B, self-contained frame structures provide an opportunity for transmitting ACK/NACK in every subframe by simultaneously configuring a DL control zone (or, a DL control channel, a DL control region) and an UL control zone in a single subframe.

FIG. 6 is a diagram for a HARQ procedure when a UL resource of a data zone is immediately allocated.

When a data zone is always guaranteed as an UL data zone or a DL data zone (or, DL data region) based on the subframe structure shown in FIG. 5B, it may be able to perform a HARQ procedure within 5 subframes between OTA (w/initiation), i.e., UL buffer arrival, and final ACK/NACK reception.

FIG. 6 illustrates an example that HARQ ACK is received within 5 subframes. A corresponding procedure is described in the following. Subframe #1: if a data to be transmitted in UL is generated and a buffer arrival event is triggered, a UE transmits a scheduling request (SR) using an UL control zone. A subframe #2 corresponds to time for performing UL scheduling. A subframe #3 corresponds to a DL control zone. The UE receives a UL grant and prepares data to be transmitted in the subframe #3. The UE transmits UL data via a data zone in a subframe #4. A subframe #5 corresponds to time for a base station to receive data and perform Rx processing. The UE receives ACK via a DL control channel in a subframe #6.

According to the abovementioned procedure, from the timing at which the buffer arrival event occurred to the timing at which the ACK is received, it is able to see that the procedure occurs within 5 subframes. Hence, if TTI is configured by 0.2 ms, 'OTA (w/ initiation)<1 ms' is satisfied. However, since a data zone is restricted to a UL data zone or a DL data zone in a single subframe, if DL (or UL) traffic considerably occurs, as shown in FIG. 7, it is apparent that a case of failing to transmit DL (or UL) traffic occurs.

FIG. 7 is a diagram for a HARQ procedure when a UL resource of a data zone is not immediately allocated.

As shown in FIG. 7, if it fails to perform scheduling on UL data due to DL traffic for other UEs in a fourth subframe form the left side, latency as much as 1 subframe occurs and it is unable to satisfy 'OTA (w/ initiation)<1 ms'. Moreover, if it is necessary to transmit more DL traffic, the latency is going to be extended. In particular, in order to achieve not only asymmetry of DL/UL traffic amount but also low latency, it is necessary to guarantee the degree of freedom of DL/UL traffic as much as possible in a data zone.

The present invention proposes a new frame structure capable of satisfying low latency and DL/UL data flexibility on the basis of a single carrier.

Proposal 1-1

Figure 8:
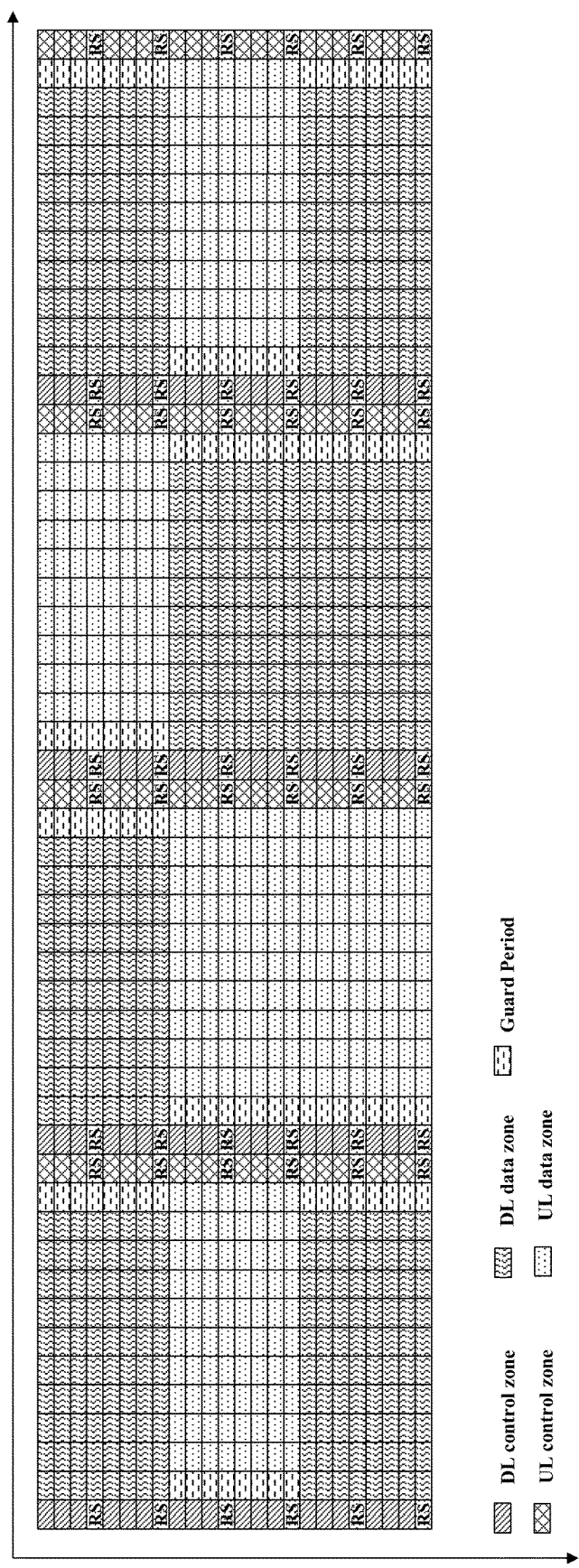
FIG. 8 is a diagram for a new frame structure according to a proposal 1-1 of the present invention.

FIG. 8 is a diagram for a new frame structure according to a proposal 1-1 of the present invention.

As shown in FIG. 8, a subframe is mainly divided into a DL control zone (or DL control channel), a GP, a data zone (data region or data channel), and a UL control zone (or UL control channel) on a single carrier. A frame structure shown in FIG. 8 corresponds to a frame structure which is configured under the assumption that a base station operates in a full duplex radio (FDR) scheme. Meanwhile, the frame structure shown in FIG. 8 may correspond to a frame structure allocated by a base station for a single UE. For example, if the frame structure shown in FIG. 8 corresponds to a frame structure allocated by a base station for a single UE, a DL data zone, a UL data zone, and a UL data zone are allocated to the UE according to a band in frequency domain direction in a first subframe shown in FIG. 8. In this case, the UE receives DL data from the base station on a band represented by DL and transmits UL data to the base station on a band represented by UL. In particular, the frame structure shown in FIG. 8 may correspond to a frame structure allocated to the UE under the assumption that the UE is able to operate in the FDR as well.

In FIG. 8, the DL data zone and the UL data zone, which are allocated according to a band in a subframe, can be differently configured according to a subframe. For example, referring to FIG. 8, a DL data zone, a UL data zone, and a UL data zone can be allocated according to a band in frequency domain direction in a second subframe.

As shown in FIG. 8, a DL control zone is located at the first (start) of a subframe in time domain, a data zone (a zone represented by DL, UL) is located right after the DL control zone, and a UL control zone is lastly located after the data zone. In this case, the data zone can be used as a DL data or a UL data in frequency domain without any restriction. And, a GP is located between the DL control zone and the data zone when data belonging to a corresponding band corresponds to UL. On the contrary, when data corresponds to DL, a GP is located between the data zone and the UL control zone.

As shown in FIG. 8, a UL transmission occasion and a DL transmission occasion exist at the same time in a data zone in every subframe. In particular, it is able to prevent additional latency due to the restriction of a legacy data zone restricted to DL or UL. If a length of a subframe is configured to be equal to or less than 0.2 ms, it is able to achieve 'OTA (w/ initiation)<1 ms'.

Moreover, a base station may have more efficiency via DL/UL flexibility of the data zone in the aspect of utilizing DL/UL data resource compared to a legacy self-contained TDD frame structure. Hence, the frame structure shown in FIG. 8 is able to get rid of inefficiency due to the asymmetry of DL/UL traffic and achieve low latency.

Embodiment of Proposal 1-1

Embodiment for a method of achieving low latency and an operating method when DL data transmission timing is overlapped with UL data transmission timing are described in the following.

Figure 9:
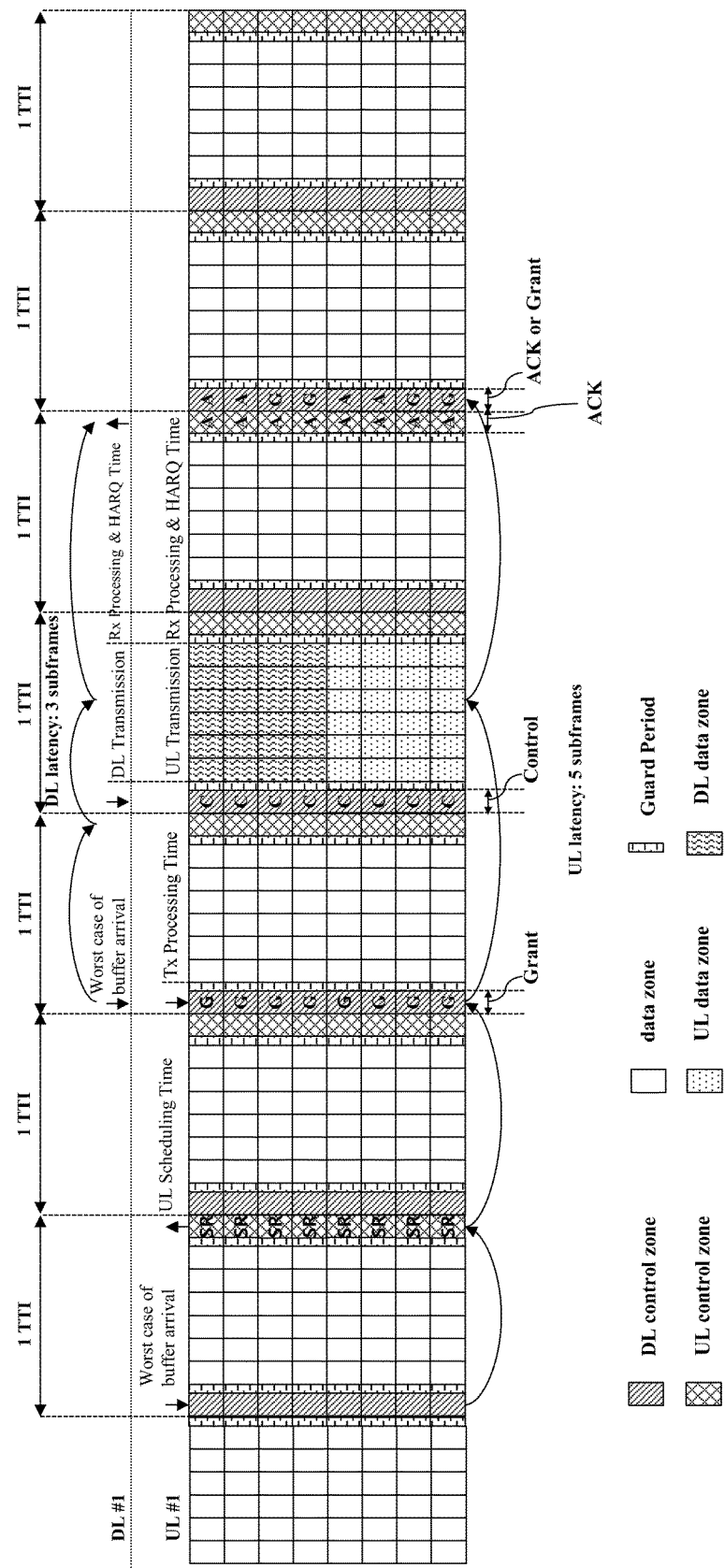
FIG. 9 is a diagram for explaining a case that DL transmission timing is overlapped with UL transmission timing.

FIG. 9 is a diagram for explaining a case that DL transmission timing is overlapped with UL transmission timing.

As shown in FIG. 9, when a DL buffer arrival event and a DL buffer arrival event respectively occur, one of the two buffer arrival events has no choice but to be delayed in a legacy frame structure. In FIG. 9, it is assumed that 2 traffics (DL traffic and UL traffic) are overlapped. If more traffic occurs at the same time, more latency may occur.

On the other hand, referring to a frame structure shown in FIG. 9, since a DL data zone and a UL data zone are allocated within a subframe, it is able to transmit DL data and UL data at the same time and simultaneous transmission is also supported while minimum latency is maintained. The frame structure shown in FIG. 9 has a merit in that a gain increases according to the increase of traffic.

Proposal 1-2

A DL control zone and a UL control zone can be configured by 1 to N number of symbols. A GP is configured by an integer multiple of a symbol. More specifically, a length of a GP can be configured by an integer multiple of a unit symbol allocated to a data zone.

In general, a length of a GP is designed by a round trip time (RTT) and RF switching time (from DL to UL/from UL to DL). Hence, the length of the GP can be determined by a method of minimizing overhead in consideration of RTT and RF switching time overhead (e.g., a self-contained frame structure).

If the frame structure shown in FIG. 8 corresponds to a frame structure allocated by a base station for a plurality of UEs, the base station operates in a full duplex scheme that performs UL/DL data transmission and reception at the same time in a data zone. On the contrary, The UEs operate in a half-duplex scheme that performs either transmission or reception only. Hence, it is necessary for the base station to transmit DL data and receive UL data at the same time. In this case, if GPs are configured according to a legacy method, as shown in FIG. 10, it is apparent that interference occurs due to the mismatch between symbol boundaries.

Figure 10:
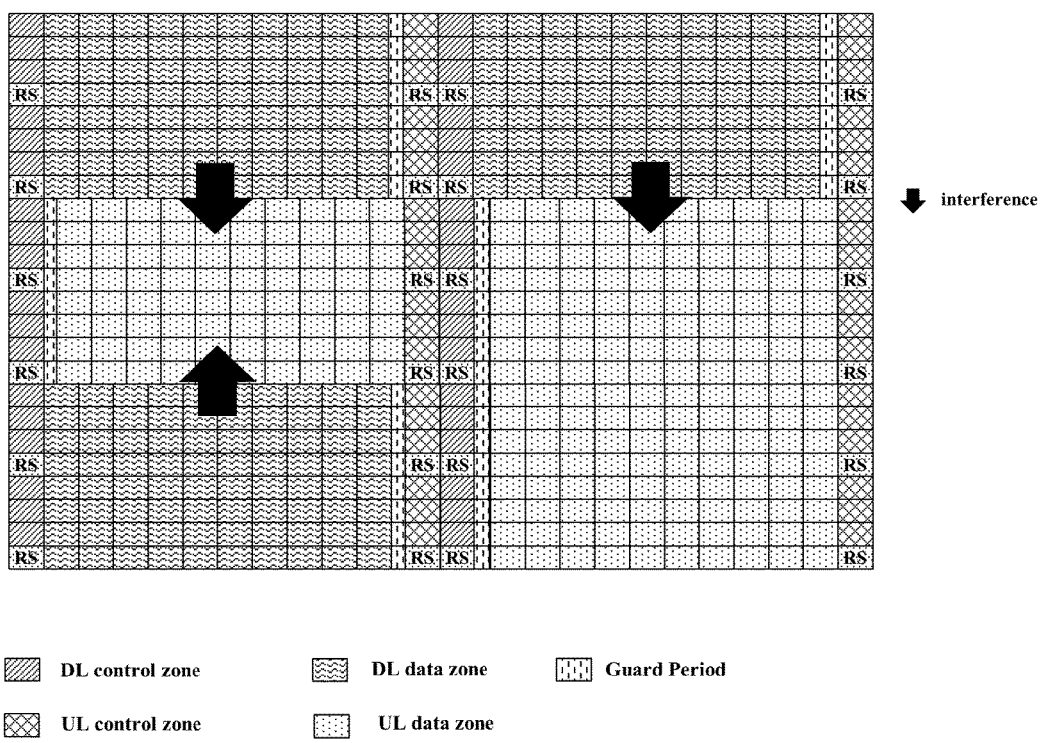
FIG. 10 is a diagram illustrating an example that a DL data symbol boundary is not matched with a UL data symbol boundary in a data zone in a base station.

FIG. 10 is a diagram illustrating an example that a DL data symbol boundary is not matched with a UL data symbol boundary in a data zone in a base station.

A base station receives data transmitted in DL within in-band. Hence, if a level of the mismatch is less than a CP length, it is able to receive UL data without interference on an ideal channel via orthogonality of OFDM. Yet, as shown in FIG. 10, a GP makes a symbol boundary between UL data and DL data to be mismatched. Hence, as shown in FIG. 8, it may be able to cancel the interference by configuring a GP length of a data zone by a symbol length.

In particular, the GP length of the data zone is configured to satisfy equation 1 in the following all the time by making the GP length to be an integer multiple of a length of a unit symbol that constructs the data zone.

$$\text{Length of data zone} \div \text{Number of symbols in data zone} = \text{Length of single symbol} = T\_cp + T\_u = GP \text{ length} + k \quad \text{[Equation 1]}$$

In this case, k is a natural number, T_cp corresponds to a CP length, and T_u corresponds to a length of a data part in a symbol. In particular, a length of a GP becomes an integer multiple of a length of a unit symbol that constructs a data zone.

And, a DL control zone and a UL control zone can be configured by N number of symbols without being restricted to a single symbol.

The frame structure shown in FIG. 10 requires a transceiver configured to perform DL and UL (i.e., transmission and reception) at the same time in a DL zone. A structure of the transceiver can be configured as follows.

Figure 11:
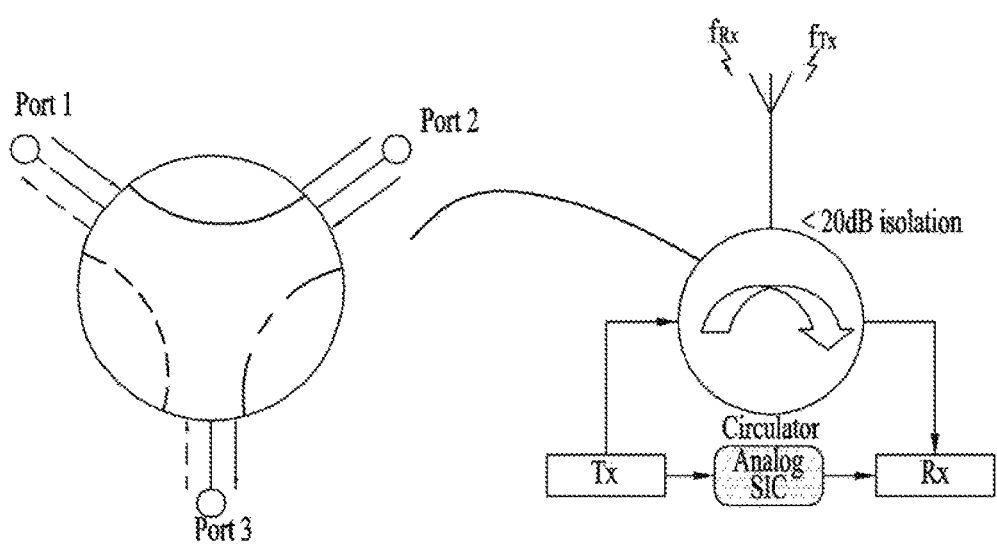
FIG. 11 is a diagram illustrating an example of an RF structure of a transceiver of a base station.

FIG. 11 is a diagram illustrating an example of an RF structure of a transceiver of a base station.

FIG. 11 illustrates configurations of devices for performing transmission and reception at the same time in a single carrier. First of all, in order to reduce power leakage that a signal transmitted by a base station is entering a receiving end, a signal is attenuated using a circulator. In addition, it may be able to additionally suppress a self-interference signal via an analog SIC device.

The frame structure proposed in the proposal 1 has the characteristic that transmission occasion of DL/UL traffic of FDD is always guaranteed in a legacy system. The frame structure can also efficiently use a resource according to asymmetry of DL/UL traffic of TDD.

In the following, a frame structure of a base station and a UE operating in a TDD or FDD mode is proposed.

Proposal 2-1

In a TDD carrier, a subframe is mainly divided into a DL control zone, a GP, a data zone, and a UL control zone. The DL control zone is located at the first of the subframe, the data zone is located right after the DL control zone, and the UL control zone is lastly located after the data zone. In this case, the data zone can be used as a DL data or a UL data in the subframe. And, a GP is located between the DL control zone and the data zone when data belonging to a corresponding band corresponds to UL. On the contrary, when data corresponds to DL data, a GP is located between the data zone and the UL control zone. The DL control zone and the UL control zone can be configured by 1 to N number of symbols. A GP is configured by an integer multiple of a symbol.

Figure 12:
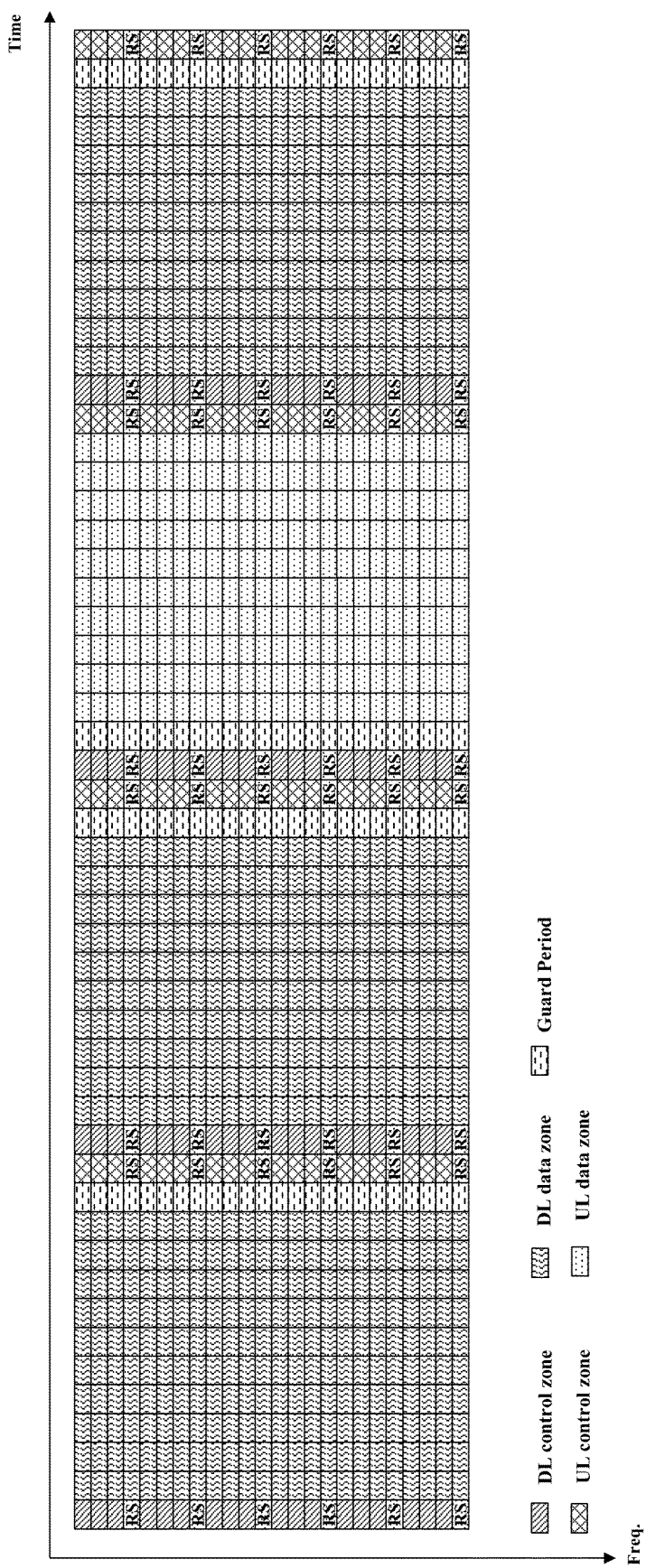
FIG. 12 is a diagram illustrating an example of a frame structure time-frequency resource on a TDD carrier.

FIG. 12 is a diagram illustrating an example of a frame structure time-frequency resource on a TDD carrier.

As shown in FIG. 12, a data zone of every subframe is allocated as a UL data zone or a DL data zone. Hence DL/UL flexibility is lowered compared to the frame structure of the proposal 1. Yet, since the DL control zone and the UL control zone are still located within a single subframe, 'OTA (w/ initiation)<1 ms' can be achieved by a scheduler. Moreover, since it is able to utilize the data zone as a DL data zone or a UL data zone by the scheduler, it is apparent that the frame structure is more DL/UL flexible compared to the legacy LTE TDD.

A length of a GP is configured by a multiple of a symbol length. This makes numerology (subcarrier spacing, CP length, symbol length, number of symbols in a TTI) used in TDD to be identically used in a FDD frame structure. In particular, it is a design method for providing commonality as much as possible in the TDD and FDD frame structures. As a result, it may be able to maintain a lot of common parts in a baseband operation.

For example, when a GP is designed by a length of half symbol without being maintained by the length of one symbol, if the same TTI is applied, the number of symbols or a CP length varies in TDD and FDD and it breaks unity in terms of an implementation device. As a result, it may implement TDD and FDD, respectively. On the contrary, if a GP length is maintained by a multiple of a symbol length, since it is able to commonly use a CP, a symbol length, and the like, it may have an advantage that a commonly used implementation part increases.

Proposal 2-2

Figure 13:
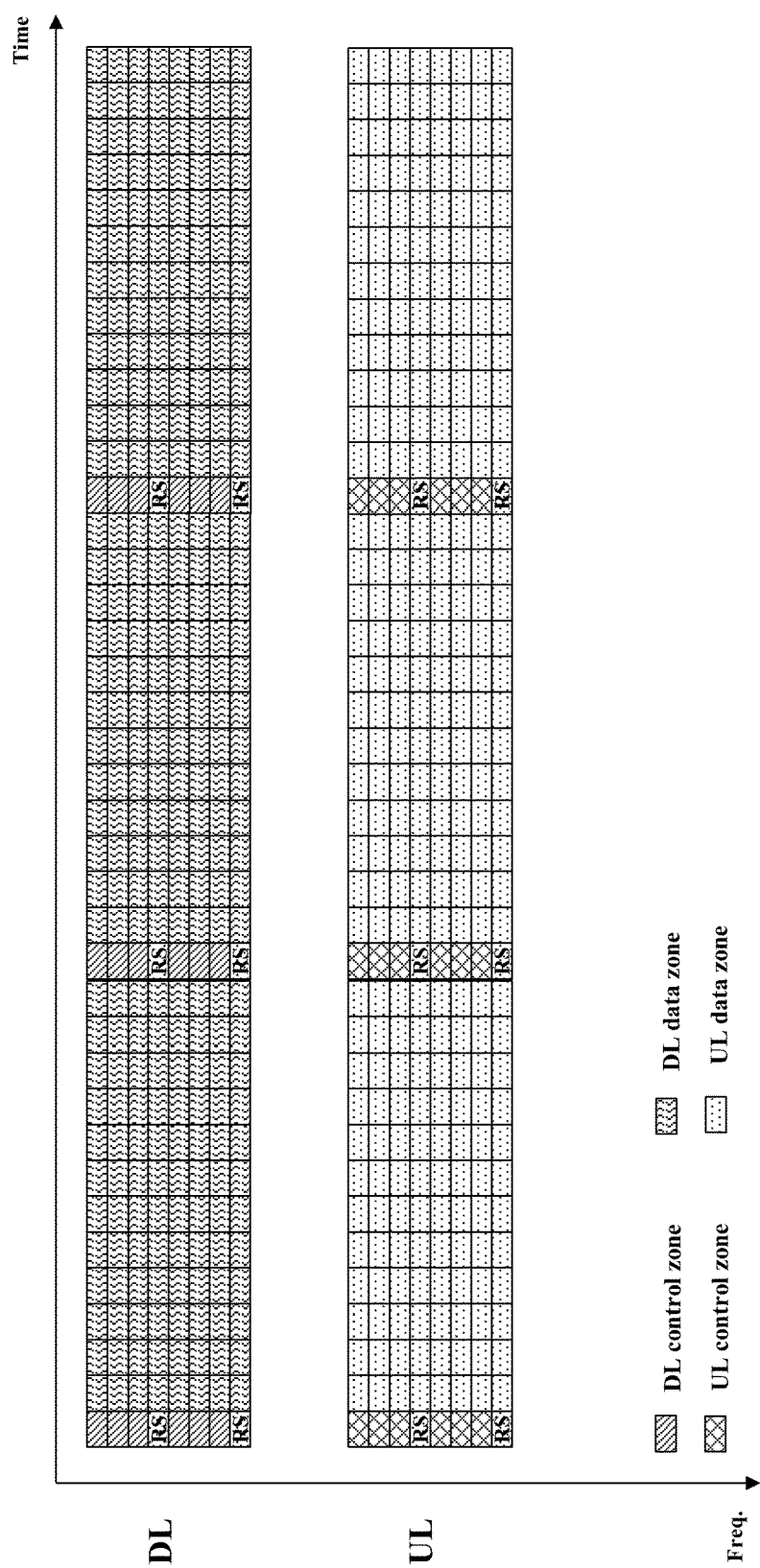
FIG. 13 is a diagram illustrating an example of a frame structure time-frequency resource on a FDD carrier.

FIG. 13 is a diagram illustrating an example of a frame structure time-frequency resource on a FDD carrier.

In FIG. 13, a subframe is mainly divided into a control zone and a data zone on a FDD carrier. In case of DL, the control zone is located at the first of the subframe and the data zone is located after the control zone. In case of UL, a UL control zone is located at the first of the subframe and a data zone is located after the UL control zone.

FIG. 13 illustrates a frame structure that a GP is utilized as a data and a control zone is located at the first part of a subframe in a legacy TDD frame structure. As mentioned in the foregoing description, commonality is maximized by maintaining a common part with the legacy TDD frame structure as much as possible.

As mentioned in the foregoing description, the frame structure according to the proposal provided by the present invention can achieve low latency (i.e., OTA (w/ initiation) <1 ms) corresponding to 5G service requirement and provide DL/UL flexibility capable of efficiently supporting asymmetry of DL/UL traffic as much as possible.

In the foregoing description, the new frame structure has been proposed to achieve low latency (i.e., OTA (w/ initiation)<1 ms) corresponding to 5G service requirement and provide DL/UL flexibility capable of efficiently supporting asymmetry of DL/UL traffic as much as possible. In the proposal 1, DL/UL flexibility is provided via a structure capable of transmitting DL and UL at the same time by dividing a data zone according to a frequency band. On the other hand, according to the TDD frame structure proposed in the proposal 2-1, a data zone of a subframe is determined as either UL or DL by a scheduler of a base station. Hence, the degree of freedom of DL/UL is basically lower than that of the proposal 1.

Hence, it is necessary to have a method of improving flexibility of traffic amount of DL and UL in TDD structure. In particular, it is able to more enhance frequency efficiency in such a service having a very small packet size and a sporadic characteristic as mMTC.

In the following, a new frame structure for enhancing DL/UL flexibility in the TDD frame structure mentioned earlier in the proposal 2-1 is proposed.

Proposal 3: Configurable New Frame Structure for Unpaired Spectrum (TDD) in 5G Systems The new TDD frame structure proposed in the proposal 2-1 provides lower latency and DL/UL flexibility of a data zone compared to a legacy LTE TDD structure. However, due to the characteristic of TDD, it may use a resource in one direction (i.e., UL or DL) only at specific time. Thus, a data zone of a subframe in new TDD frame structure used as DL or UL. As a result, if UL data traffic occurs, the entire data zone should be used for UL. In this case, if an amount of the traffic occurred in UL is insignificant, the waste of the data zone in a corresponding subframe become significant.

In particular, since a bandwidth of a wideband (~100 MHz) is considered for 5G service, inefficiency of a resource is significant. Moreover, if terminals sporadically generate a very small packet size in an mMTC service, efficiency of a resource is more degraded. As a solution, it may configure a TTI to be shorter. However, it makes GP overhead to be increased as much as twice and increases overhead of DL control as well. Hence, it is necessary to have a method of more enhancing DL/UL flexibility in the current frame structure. The present invention proposes a new frame structure for enhancing DL/UL data flexibility in a TDD frame structure and signaling therefor.

Proposal 3-1

In a carrier which operates on TDD scheme, a subframe is mainly configured in an order of a DL control zone, a DL data zone, a GP, a UL data zone, and a UL control zone. In this case, a size of the DL data zone and a size of the UL data zone are determined according to a position of the GP. The GP may be positioned at any position in the data zone.

Figure 14:
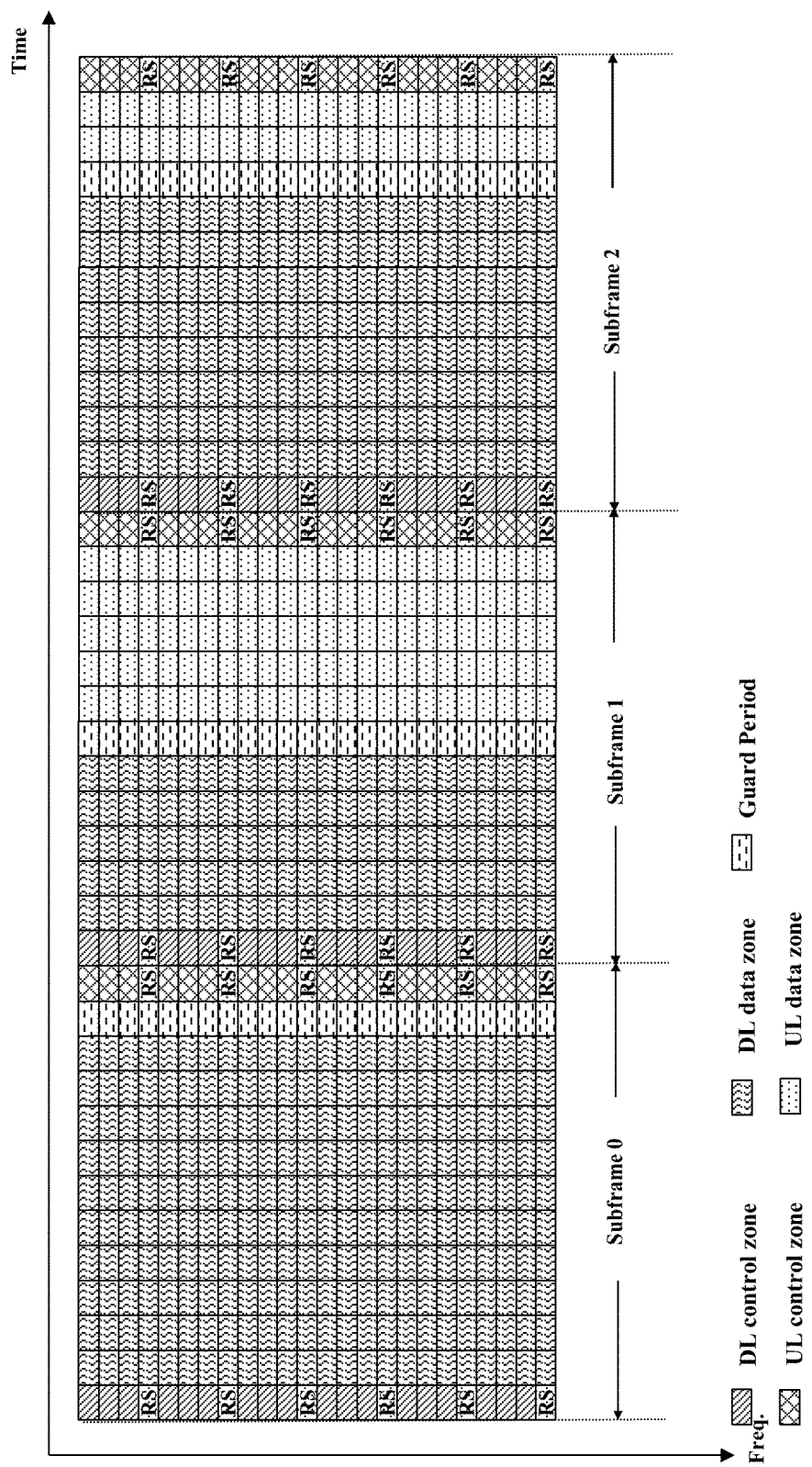
FIG. 14 is a diagram illustrating an example of a frame structure configurable in TDD.

FIG. 14 is a diagram illustrating an example of a frame structure configurable in TDD.

Referring to FIG. 4, a second subframe (subframe 1) includes a DL data zone (represented as DL in a subframe 1) of a size of 5 symbols, a GP, and a UL data zone (represented as UL in the subframe 1) of a size of 5 symbols. And, a third subframe (subframe 2) includes a DL data zone of a size of 8 symbols, a GP, and a UL data zone of a size of 2 symbols. This configuration method can be appropriately controlled by a scheduler of a base station according to traffic amount. If the GP is positioned at the first symbol or the last symbol of the data zone, the whole of the data zone can be used as either UL or DL.

Since a size of a DL data zone is big in a subframe 0, a GP is positioned after the DL data zone and a UL control zone is positioned after the GP. In this case, UE processing time for transmitting HARQ ACK/NACK in the UL control zone of the subframe 0 in response to DL reception in the subframe 0 is insufficient. Hence, a UE can transmit the HARQ ACK/NACK in response to DL reception in the subframe 0 in a UL control zone of a subframe 1 corresponding to a next subframe.

Meanwhile, since a size of a DL data zone of the subframe 1 is smaller than that of the subframe 0, UE processing time is secured. Hence, a UE can transmit HARQ ACK/NACK in the UL control zone of the subframe 1 in response to DL reception in the subframe 1. Similar to the data zone respectively set to the subframe 0 and the subframe 1, a size of the DL data zone and a size of the UL data zone can be flexibly changed according to a subframe based on the DL/UL flexibility property. By assigning number of symbols smaller than symbols assigned to DL data zone of the subframe 0 are assigned to the DL data zone of the subframe 1, a UE can immediately transmit HARQ ACK/NACK in the subframe 1 in response to DL reception in the subframe 1.

Proposal 3-2: base station can signal location information of GP to UE in every subframe via DL control zone According to the legacy LTE system, TDD configuration is signaled through system information block type 1 (SIB1). In case of the SIB1, transmission is performed in every 80 ms. This configuration method is not sufficient enough for dynamically controlling DL/UL traffic amount in various services of 5G. Hence, the present invention enhances flexibility of DL/UL data in a manner that a base station informs a UE of information in a DL control zone of every subframe. In particular, it may be able to enhance DL/UL flexibility by changing a legacy cell-specific configuration method with a subframe-specific configuration method.

When the base station informs the UE of information, the information may include information related to a position of a GP in a data zone of a specific subframe (a corresponding subframe or a subframe appearing after M number of subframes).

When the number of symbols of a data zone corresponds to N in total, the information related to the position of the GP in the data zone is configured by a size as much as the number of bits rounded from log 2N. And, it may be able to reduce the number of bits by reducing subdivision of the GP position. For example, when a data zone is configured by 10 symbols in total, a position of a GP can be indicated by 4 bits. If the data zone is configured by 1, 4, 7, or 10 symbols only, the GP position can be indicated by 2 bits. A method of signaling the information related to the position of the GP in the data zone may be divided into two methods described in the following.

1. In case of indicating a GP position of a corresponding subframe

Method 1: A base station may inform a UE of location information of a GP via a DL control channel (e.g., PDCCH, EPDCCH) in a DL control zone. In this case, the location information of the GP may be indicated to all UEs to which a resource is allocated in a corresponding subframe via a common search space. For decoding, the location information of the GP may be transmitted in a manner of being masked with an ID (e.g., SI-RNTI) known to all UEs.

Method 2: A base station may inform a UE of location information of a GP via an independent channel (e.g., PCFICH). Unlike the method 1 performing blind decoding, the method 2 can increase robustness of detection and reduce calculation complexity of a UE by determining MCS and an RE position.

If the UE knows the location information of the GP, the UE can know that a UL data zone is positioned before and after the GP in the DL data zone. In particular, if the UE receives the location information of the GP, the UE is able to receive DL data during a period ranging from a symbol appearing after the DL control zone to a symbol immediately before a symbol at which the GP is positioned. The UE can transmit UL data during a period ranging from a symbol appearing after the GP to a symbol immediately before the last symbol.

2. In case of indicating GP position after next M frames

Method 1: A base station may inform a UE of location information of a GP via a DL control information channel (e.g., PDCCH, EPDCCH) in a DL control zone. In this case, the location information of the GP can be indicated to all UEs to which a resource is allocated after next M subframes via a common search space. For decoding, the location information of the GP can be transmitted in a manner of being masked with an ID (e.g., SI-RNTI) known to all UEs.

Method 2: A base station may inform a UE of location information of a GP after next M subframes via an independent channel (e.g., PCFICH). Unlike the method 1 performing blind decoding, the method 2 can increase robustness of detection and reduce calculation complexity of a UE by determining a determined MCS and an RE position.

A GP position can be subframe-specifically configured and it is not necessary to UE-specifically configure the GP position.

The proposed frame structure can provide more enhanced DL/UL flexibility using a configurable frame structure and a signaling method.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of transmitting and receiving a signal using a TDD scheme in a wireless communication system and an apparatus therefor can be applied to various wireless communication systems including 3GPP LTE/LTE-A, 5G system, and the like.

What is claimed is:

1. A method for transmitting and receiving signals, by a communication apparatus, based on a TDD scheme using a plurality of subframes in a wireless communication system, the method comprising:
receiving information related to a position of a guard period (GP) in a data zone of a specific subframe, wherein each of the plurality of subframes includes a downlink control zone, a data zone and an uplink control zone in sequence, each of the plurality of subframes is one of among a first subframe, a second subframe and a third subframe, a first data zone of the first subframe includes a first GP and a first uplink data zone in sequence, a second data zone of the second subframe includes a first downlink data zone and a second GP in sequence, and a third data zone of the third subframe includes a second downlink data zone, a third GP and a second uplink data zone in sequence;
receiving downlink data in the data zone of the specific subframe based on the information related to the position of the GP, wherein the specific subframe is one of among the second subframe and the third subframe, and the data zone is a corresponding one of among the first downlink data zone and the second downlink data zone; and
transmitting uplink data in the data zone of the specific subframe based on the information related to the position of the GP, wherein the specific subframe is one of among the first subframe and the second subframe, and the data zone is a corresponding one of among the first uplink data zone and the second uplink data zone.

2. The method of claim 1, wherein the information related to the position of the GP in the data zone is received in the specific subframe.

3. The method of claim 2, wherein the information related to the position of the GP in the data zone is received via a physical control format indicator channel (PCFICH) of the specific subframe.

4. The method of claim 2, wherein the information related to the position of the GP in the data zone is received via a downlink control channel of the specific subframe.

5. The method of claim 1, wherein the infoiination related to the position of the GP in the data zone is received in a subframe appearing prior to the specific subframe as many as M number of subframes.

6. The method of claim 1, wherein the specific subframe is the first subframe based on the position of the GP being located at a starting symbol of the data zone, and the specific subframe is the second subframe based on the position of the GP being a last symbol of the data zone.

7. The method of claim 6, wherein the specific subframe is the third subframe based on the position of the GP being located at remaining symbols of the data zone, and the remaining symbols are located between the starting symbol and the last symbol.

8. The method of claim 1, wherein a time interval of the GP is same as a time interval of one symbol.

9. The method of claim 1, wherein a time interval of one subframe is equal to or less than 0.2 ms.

10. A communication apparatus for transmitting and receiving signals based on a TDD scheme using a plurality of subframes in a wireless communication system, the communication apparatus comprising:
a receiver;
a transmitter; and
a processor configured to control:
the receiver to receive information related to a position of a guard period (GP) in a data zone of a specific subframe, wherein each of the plurality of subframes includes a downlink control zone, a data zone and an uplink control zone in sequence, each of the plurality of subframes is one of among a first subframe, a second subframe and a third subframe, a first data zone of the first subframe includes a first GP and a first uplink data zone in sequence, a second data zone of the second subframe includes a first downlink data zone and a second GP in sequence, and a third data zone of the third subframe includes a second downlink data zone, a third GP and a second uplink data zone in sequence;
the receiver to receive downlink data in the data zone of the specific subframe based on the information related to the position of the GP, wherein the specific subframe is one of among the second subframe and the third subframe, and the data zone is a corresponding one of among the first downlink data zone and the second downlink data zone; and
the transmitter to transmit uplink data in the data zone of the specific subframe based on the information related to the position of the GP, wherein the specific subframe is one of among the first subframe and the second subframe, and the data zone is a corresponding one of among the first uplink data zone and the second uplink data zone.

11. The communication apparatus of claim 10, wherein the processor is configured to control the receiver to receive the information related to the position of the GP in the data zone of the specific subframe.

12. The communication apparatus of claim 11, wherein the processor is configured to control the receiver to receive the information related to the position of the GP in the data zone via a physical control format indicator channel (PCFICH) of the specific subframe.

13. The communication apparatus of claim 11, wherein the processor is configured to control the receiver to receive the information related to the position of the GP in the data zone via a downlink control channel of the specific subframe.

14. The communication apparatus of claim 10, wherein the processor is configured to control the receiver to receive the information related to the position of the GP in the data zone in a subframe appearing prior to the specific subframe as many as M number of subframes.

15. The communication apparatus of claim 10, wherein the specific subframe is the first subframe based on the position of the GP being located at a starting symbol of the data zone, and the specific subframe is the second subframe based on the position of the GP being a last symbol of the data zone.

16. The communication apparatus of claim 10, wherein the specific subframe is the third subframe based on the position of the GP being located at remaining symbols of the data zone, and the remaining symbols are located between the starting symbol and the last symbol.

17. The communication apparatus of claim 10, wherein a time interval of the GP is same as a time interval of one symbol.

18. The communication apparatus of claim 10, wherein a time interval of one subframe is equal to or less than 0.2 ms.

* * * * *